(12) United States Patent
Rangwalla et al.

(10) Patent No.: US 6,541,088 B1
(45) Date of Patent: Apr. 1, 2003

(54) ALKYLENIMINE/ORGANIC BARRIER COATINGS HAVING BIS-SILANE ADDITIVES

(75) Inventors: Imtiaz J. Rangwalla, Andover, MA (US); John E. Wyman, Sanibel, FL (US); Patrick Jacques Jean Merlin, Belgium (BE); Shrenik Mahesh Nanavati, Midland, MI (US); Lisa Marie Seibel, Dexter, MI (US); Laurence Gallez, Belgium (BE)

(73) Assignees: EG Technology Partners, L.P., Wilmington, MA (US); Dow Corning Corporation, Midland, MI (US); Dow Corning S.A., Seneffe (BE)

( * ) Notice: Subject to any disclaimer, the term of this patent is extended or adjusted under 35 U.S.C. 154(b) by 0 days.

(21) Appl. No.: 09/517,634

(22) Filed: Mar. 3, 2000

(51) Int. Cl.$^7$ ............................ B32B 1/08; B32B 25/20; C08F 2/48; C08J 7/18

(52) U.S. Cl. ............. 428/36.8; 428/35.7; 428/447; 428/448; 428/451; 428/452; 427/302; 427/382; 427/407.1; 427/487; 427/493; 427/496; 427/532; 427/551; 427/595; 522/172; 522/173; 522/182; 556/413; 556/424

(58) Field of Search ............................ 428/35.7, 36.8, 428/447, 448, 451, 452; 427/302, 387, 407–1, 487, 493, 496, 532, 551, 595; 522/172, 173, 182; 556/413, 424

(56) References Cited

U.S. PATENT DOCUMENTS

| 2,832,754 | A | | 4/1958 | Kenmore et al. ........... 260/46.5 |
|---|---|---|---|---|
| 2,920,095 | A | | 1/1960 | Jex et al. .................. 260/448.8 |
| 4,167,537 | A | * | 9/1979 | Taniyama et al. ............ 525/443 |
| 4,640,868 | A | * | 2/1987 | Penn ........................... 428/446 |
| 4,659,798 | A | * | 4/1987 | Pohl et al. ..................... 528/33 |
| 4,761,435 | A | | 8/1988 | Murphy et al. ................ 522/46 |
| 4,943,600 | A | | 7/1990 | Noren et al. ................. 522/106 |
| 5,017,406 | A | | 5/1991 | Lutz et al. .................. 427/54.1 |
| 5,101,055 | A | | 3/1992 | Dinh et al. ................... 556/413 |
| 5,260,350 | A | * | 11/1993 | Wright ......................... 522/42 |
| 5,489,455 | A | * | 2/1996 | Nugent, Jr. et al. ...... 428/36.91 |
| 5,948,927 | A | * | 9/1999 | Gunther et al. ............. 556/419 |
| 6,262,216 | B1 | * | 7/2001 | McGall ....................... 528/10 |
| 6,281,322 | B1 | * | 8/2001 | Groth et al. .................. 528/28 |

FOREIGN PATENT DOCUMENTS

| JP | 07-018221 | | 1/1995 |
|---|---|---|---|
| WO | WO 93/31720 | * | 7/1998 |
| WO | WO 98/31539 | * | 7/1998 |
| WO | WO 98/31541 | * | 7/1998 |
| WO | WO 98/31719 | * | 7/1998 |

* cited by examiner

*Primary Examiner*—Robert Dawson
*Assistant Examiner*—Jeffrey B. Robertson
(74) *Attorney, Agent, or Firm*—Richard Gearhart; Jim L. De Cesare; Alan Zombeck

(57) ABSTRACT

A composition which provides gas, flavor, and aroma barrier to substrates, where the composition is formed by mixing an ethylenically unsaturated acid, a bis-silane and a polyamine.

39 Claims, No Drawings

ALKYLENIMINE/ORGANIC BARRIER COATINGS HAVING BIS-SILANE ADDITIVES

FIELD OF THE INVENTION

The invention relates to coatings containing a polyamine, a bis-silane and an ethylenically unsaturated acid which have barrier properties useful in packaging applications.

BACKGROUND OF THE INVENTION

It is well known that coatings containing polyamine silane compounds and itaconic acid improve the gas, oil, and flavor barrier performance of organic polymer film substrates (See PCT/BE98/00009, the U.S. equivalent of which is U.S. Ser. No. 09/341,252, filed Jul. 15, 1999, now U.S. Pat. No. 6,389,171). Moreover, the adhesion of the coating to the film surface, as well as the improved barrier characteristics provided by the silane coating, are greatly enhanced by exposing the coated film to electron beam radiation.

These coatings represent a significant advance in the art. However, it has been observed that while the barrier properties of the prior art coatings are excellent in environments at relative humidities of 80% or less, their performance suffers significantly at relative humidities of 90% or more.

The present inventors have surprisingly discovered that the combination of a polyamine, an ethylenically unsaturated acid, and a bis-silane gives excellent gas barrier properties at low to moderate relative humidity values, as well as excellent gas barrier properties at very high relative humidity values of 90% or more. The key improvement is the addition of a bis-silane, which results in excellent barrier at humidities of greater than 90%. The composition may be crosslinked to further improve barrier. As used herein, the term "barrier" means improving to at least 750 cc/m²/day a 30 μm uncoated biaxilly oriented, corona treated polypropylene film, having a permeability measured at 0% relative humidity to oxygen of 1191 cc/M²/day and a permeability measured at 90% relative humidity to oxygen of 1238 cc/M²/day as measured at ASTM D3985-81.

None of the prior art teaches the present invention. For example, U.S. Pat. No. 4,761,435 claims UV curable polyethylenically unsaturated compositions in combination with a polyamine resin, which use an aryl ketone photosensitizer. The '435 patent teaches that acid functionality in the compositions is undesirable (col. 5, line 24). The patentees indicate that the formation of amine salts is to be avoided, because the photosensitizer reacts only with an amine, and not an amine salt. This is in contrast to the present invention, which teaches that the formation of acid salts is desirable and results in superior barrier properties.

Another example, U.S. Pat. No. 4,943,600, teaches the combination of a tertiary amine containing resin, allyl terminated resin, and a maleate functional resin. Likewise the patentee teaches that the compositions are formulated to minimize or eliminate carboxyl functionality, which contrasts directly with the present invention.

U.S. Pat. No. 5,017,406 claims UV curable compositions which contain reactive unsaturated compounds, but does not teach the use of a polyamine or an unsaturated acid as does the present invention.

JP (Kokai) publication 7-18221 published on Jan. 20, 1995 teaches a surface treatment composition for gas barrier comprising an aminosilane and a compound having an aromatic ring or hydrogenated ring. The present invention is distinguishable, however, because it does not require the addition of cyclic compounds having an aromatic ring, nor does the reference teach the addition of an ethylenically unsaturated acid.

The present invention is distinguishable from the prior art because none teach the use of a polyamine, a bis-silane and an ethylenically unsaturated acid to achieve gas barrier properties.

SUMMARY OF THE INVENTION

The present invention teaches a composition which provides gas, flavor, and aroma barrier to substrates, where the composition is formed by mixing an ethylenically unsaturated acid, a bis-silane and a polyamine, wherein said polyamine optionally has a crosslinker reacted therein, and wherein said polyamine has four or more A, B, or C units, where:

A is an $-R^2-N(R^1)_2$ unit, B is an $R^1-N(R^2-)_2$ unit, and C is an $(-R^2)_3N-$ unit, where: $R^1$ is independently a monovalent group selected from hydrogen, alkyl, substituted alkyl, aryl, substituted aryl, arylalkyl, and alkylaryl, and $R^2$ is independently selected from the group consisting of: linear or branched alkylene groups or substituted alkylene groups having from 1 to 18 carbon atoms, and arylene groups or substituted arylene groups having from 6 to 18 carbon atoms.

The composition is coated on a substrate then optionally treated to initiate a free radical reaction. The invention can be applied as a coating to a variety of substrates used in packaging applications.

DESCRIPTION OF THE PREFERRED EMBODIMENTS

While the invention is susceptible of embodiment in many different forms there is described herein in detail preferred and alternate embodiments of the invention. It should be understood, however, that the present disclosure is to be considered an exemplification of the principles of the invention and is not intended to limit the spirit and scope of the invention and/or claims of the embodiments illustrated.

Polyamines

The polyamines of the present invention are polymeric, either homopolymeric or copolymeric polyamines having four or more A, B, or C units, where:

A is an $-R^2-N(R^1)_2$ unit, B is an $R^1-N(R^2-)_2$ unit, and C is an $(-R^2)_3N-$ unit, where: $R^1$ is independently a monovalent group selected from hydrogen, alkyl, substituted alkyl, aryl, substituted aryl, arylalkyl, and alkylaryl, and $R^2$ is independently selected from the group consisting of: linear or branched alkylene groups or substituted alkylene groups having from 1 to 18 carbon atoms, and arylene groups or substituted arylene groups having from 6 to 18 carbon atoms.

$R^1$ is independently selected from hydrogen, alkyl, substituted alkyl, aryl, substituted aryl, arylalkyl, alkylaryl, and $R^2$ is independently selected from the group consisting of linear or branched alkylene groups or substituted alkylene groups having from 1 to 18 carbon atoms and arlylene groups or substituted arylene groups having 6 to 18 carbon atoms. For example, $R^1$ or $R^2$ can be substituted with hydroxyl groups.

The amines of the present invention are polymeric in nature, preferably having molecular weights of from about 150 to about 2,000,000, with about 400 to about 400,000 preferred, and most preferred being from about 600 to about 80,000. The high degree of polymerization of the amine provides a lower degree of tackiness in the final composition. The lower molecular weight polyamines can be further polymerized to form higher molecular weight polyamines by methods well known in the art, such as by reaction with dialkyl halides (i.e. ethylene dichloride), diisocynates (e.g. tolydiisocyanate, hexamethylene diisocyanate), di(meth) acrylate esters (e.g. hexene diol diacrylate pentaerythritol diacrylate), diepoxides (ethylene glycol diglycidyl ether).

Examples of polyamines useful for the invention include polyvinyl amines, aminofinctional polyacryl amides, poly-DADMAC's polyvinyl pyrrolidone copolymers, polyethylenimine and the reaction product of ethylene diamine and epichlorohydrin copolymers.

A preferred polyamine that can be used to achieve varying degrees of tackiness is the class of polyamines referred to as polyalkylenimines, such as polyethylenimine, which is readily available in a wide range of molecular weights and different degrees of branching. Polyethylenimines consist of a large family of water-soluble, i.e. hydrophilic, polyamines of varying molecular weight and degree of chemical modification. It is generally known that the polymerization of ethylenimine does not result in a polymer that is completely composed of units having a linear structure, but that also the degree of branching in polyethylenimine depends on the acid concentration and the temperature during polymerization. This degree of branching may, for example, vary between 12 and 38 percent. The formula of polyethylenimine can be represented in the form of A, B, or C units, where:

A is an —$R^2$—$N(R^1)_2$ unit, B is an $R^1$—$N(R^2$—$)_2$ unit, and C is an (—$R^2$)$_3$N— unit, where $R^1$ is hydrogen $R^2$ is an —$CH_2CH_2$— group. The ratio of A to B to C units can be from about 1:0.5:0.5 to about 1:2:1, but is preferably from about 1:1:1 to about 1:2:1.

Additional groups may be grafted onto polyethylenimines using methods well known in the art, to change the affinity of the coating to the substrate, or the adhesive properties. Examples of polyethylenimine modification include reaction with ethylene oxide structures (ethylene oxide, glycidol) to introduce hydroxyl groups, reaction with cyanide and aldehydes followed by hydrolysis to introduce carboxylic acid groups ("Strecker Synthesis"), grafting of phosphoric acid or sulfonic acid groups, and grafting of lipophilic alkyl chains using alkylating agents such as dimethyl sulfate.

Preferred molecular weights of the polyethylenimine are from about 600 to about 80,000. Most preferred molecular weights of the polyethylenimine are from about 600 to about 25,000.

Typical polyethylenimines are SZ-6050, a silane grafted polyethylenimine available from Dow Coming Toray Silicone (Japan), and SP-103 and SP-110 which are 600 and 1000 molecular weight polyethylenimines available from Nippon Shokubai, (Japan).

Ethylenically Unsaturated Acid

A predetermined quantity of an ethylenically unsaturated acid is also added to the composition. By "ethylenically unsaturated acid" it is meant any acid which has vinyl unsaturation. The ethylenically unsaturated acid is likely to be added in the amount of up to about 80 parts by weight of the composition, with about 5 to about 75 parts by weight being most preferred. The most preferred ethylenically unsaturated acid for use in the present invention is itaconic acid; however, other acids such as fumaric, maleic, citraconic, acrylic, methacrylic, cinnamic, itaconic acid monomethylester, vinylphosphonic acid, sorbic acid, mesaconic acid, and vinyl sulphonic acid may be used as well. The term "ethylenically unsaturated acid" as used herein is meant to include mixtures of one or more of the aforementioned acids. Preferably, the molar ratio of gram atoms of nitrogen in the polyamine to acid groups on the acid is from about 10:1 to about 1:100, with about 5:1 to about 1:10 being preferred and about 2:1 to about 1:4 being most preferred. In fact, the acid can be added to the solubility limit of the ethylenically unsaturated acid, which is typically reached in amounts of up to about 80 parts by weight of the composition.

Bis-silanes

The key additive of the present invention is a bis-silane described by the general formula

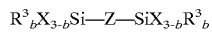

wherein Z is $R^4NH(R^4NH)_pR^4$. In this formula each R is preferably a hydrocarbon group having 1 to 10 carbon atoms, for example a saturated or unsaturated aliphatic or aromatic group, for example alkyl, alkenyl or phenyl groups; preferred groups are methyl and ethyl, the most preferred of which are methyl groups. Each X is an alkoxy group with 1 to 4 carbon atoms, a halogen atom, an oxime group or an acyloxy group, of these methoxy and ethoxy groups are preferred, the most preferred being methoxy groups. $R^4$ may be a divalent hydrocarbon group having 1 to 12 carbon atoms, preferably each $R^4$ has from 2 to 3 carbon atoms. Each b is from 0 to 3 but is most preferably 0, and p is 0 or 1. The best results are obtained by use of compounds in which each X is a methoxy group, each $R^4$ is a methylene group, b is 0, and p is 0, i.e. when the compound is bis-(gamma-trimethoxysilylpropyl)amine.

These materials may be referred to as disilylated secondary amines used in the resent invention may be prepared by processes known in the art for example, as disclosed in U.S. Pat. Nos. 2,832,754, 2,920,095 and 5,101,055.

Solvents

The components of the present invention can optionally be combined in the presence of a solvent. In general, water, alcohols and blends thereof will serve as suitable solvents because the polyamine and the ethylenically unsaturated acid are soluble therein. Another highly preferred class of solvents are ether derivatives of mono or polyglycols, such as mono or polyalkylene oxides, which includes solvents like ethylene glycol dimethyl ether. In addition, the selected solvent will preferably wet the substrate. Preferably, the solvent should be non-toxic, and will not extend the drying time of the coating beyond what is commercially acceptable. The amount of solvent can range from about 20% to about 99% and is preferably from about 60 to about 95 parts by weight of the composition. Preferred solvents are methanol, ethanol, n-propanol, isopropanol, butanol, and 1-methoxy 2-propanol (available as "Dowanol PM" from The Dow Chemical Company, Midland, Mich.).

Optional Crosslinkers

While the polyamine, the ethylenically unsaturated acid and the bis-silane may be combined to form the compositions of the present invention, it is highly preferred that a crosslinker is added to improve the barrier properties, reduce dewetting, and improve appearance. It is believed that a higher crosslink density results in these improved properties. As used herein the term "crosslinker" is defined to mean an agent which can further chain extend and/or crosslink the polyamine. The crosslinker may be an organic crosslinker or more preferably, a reactive silane crosslinker, or mixtures thereof.

Organic Crosslinkers

While the polyamine, the ethylenically unsaturated acid and the bis-silane may be combined alone to form the compositions of the present invention, it is preferred that a compound be added that will further chain extend and crosslink the polyamine chain. It is believed that a higher degree of polymerization and crosslinking of the polyamine is desirable to provide improved barrier properties and appearance of the coatings of the present invention. The compounds useful to chain extend and crosslink the polyamine chain include, but are not limited to, multifunctional acrylates, methacrylates, epoxides, isocyanates, thiocyanates, acid halides, acid anhydrides, esters, alkyl halides, aldehydes, quinones or combinations thereof. Specific examples include, but are not limited to hexanediol diacrylate, glycidyl methacrylate, ethyleneglycoldiglycidyl ether, tolyl diisocyanate, and ortho and para benzoquinones.

The polyamine can be chain extended and crosslinked either prior to or subsequent to coating the composition on a substrate. Compounds useful to chain extend and crosslink the polyamine coating include those materials which will undergo an acid catalyzed condensation reaction with the nitrogen atom of the polyamine, such as tris-methylol phenol, aldehydes such as formaldehyde and glyoxal, and mixtures of formaldehyde and active methylene compounds that will undergo a Mannich reaction.

The ethylenically unsaturated acid can be crosslinked independently of the polyamine by the addition of multifunctional compounds which will copolymerize with the ethylenically unsaturated acid. These compounds include multifunctional acrylates and methacrylates. In addition, the ethylenically unsaturated acid may be crosslinked directly into the crosslinked polyamine structure by the addition of acrylate and methacrylate functional silane. The acrylate and methacrylate functional silane compounds such as acryloxypropyltrimethoxy silane and methacryloxypropyltrimethoxysilane may be added to the compositions of this invention prior to or subsequent to the ethylenically unsaturated acid to crosslink the polyacid. Hydrolysis and condensation of the alkoxy or acyloxy groups subsequent to coating will form a polymeric material with multi functional groups which will copolymerize with the ethylenically unsaturated acid.

The organic crosslinkers are preferably added in a polyamine/organic crosslinker ratio of about 100:1 to about 1:10, with a preferred ratio being about 10:1 to about 1:1 and most preferred ratio being about 5:1 to about 2:1.

Reactive Silane Crosslinker

The most preferred compounds are those which contain both a functional group that will react with a nitrogen atom on the polyamine chain prior to addition of the ethylenically unsaturated acid to the compositions of this invention, as well as a trialkoxy or triacyloxy silane group which will undergo hydrolysis and condensation reaction subsequent to coating the composition of the present invention utilizing an optional solvent containing water.

Because the silane portion of the molecule is terminated with hydroxyl or alkoxy groups, it can condense with the hydoxy or alkoxy portion of other silicone terminated molecules to form Si—O—Si groups. The Si—O—Si bonds increase the crosslink density of the composition. The reactive silane can have the general formula $QSiR_m(OR)_{3-m}$, where Q is any group containing one or more acrylates, aldehydes, methacrylates, acrylamides, methacrylamides, isocyanates, isothiocyanates, anhydrides, epoxides, acid chlorides, linear or branched halogenated alkyl, and halogenated aryl, and m is 0, 1, or 2, and R is a group having from 1 to 4 carbon atoms. Specifically, the reactive silane includes molecules such as gamma-acryloxypropyl trimethoxysilane, gamma-methacryloxypropyl trimethoxysilane,3-glycidoxypropyl trimethoxysilane, chloropropyl trimethoxysilane, chloropropyl triethoxysilane, gamma-isocyanatopropyltriethoxysilane, vinyltriethoxysilane, vinyltrimethoxysilane, vinyl-tris-(2-expoxy cyclohexyl) silane, ethyltrimethoxy silane, chloropropyl triethoxy silane, chloropropyl ethyldimethoxy silane, methyldimethoxy silane and glycidoxypropyl methyldimethoxy silane. The most preferred reactive silanes are choropropyl trimethoxysilane available from the Dow Coming Corporation as Z-6076, chloropropyl triethoxysilane available from the Dow Corning Corporation as 1-6376 and gamma trimethoxysilylpropyl glycidyl ether, available from the Dow Coming Corporation as Z-6040. It may be necessary to neutralize the polyamine after the reaction of the haloalkyl functional crosslinker therein, such as by adding sodium methoxide and filtering off the resulting precipitate.

The reactive silanes are preferably added in a polyamine/reactive silane weight ratio of about 100:1 to about 1:10, with a preferred ratio being 10:1 to 1:1 and most preferred ratio being about 5:1 to about 2:1.

Coating Thickness

The coating can be applied in any desired amount, however, it is preferred that the coating be applied in an amount such that the coat weight is up to about 20 $\mu$m thickness global, the most preferred coating thickness being from about 0.5 to about 10 $\mu$m. Coating thickness can be determined by Scanning Electron Microscopy (SEM) analysis. The coating can be applied to the substrate by any conventional method, such as spray coating, roll coating, slot coating, meniscus coating, immersion coating, and direct, offset, and reverse gravure coating.

Substrates

The coating can be disposed on a wide variety of substrates, including, but not limited to polyolefins, such as oriented polypropylene (OPP), cast polypropylene, polyethylene and polyethylene copolymers, polystyrene, polyesters, such as polyethylene terephthalate (PET), or polyethylene naphthalate (PEN), polyolefin copolymers, such as ethylene vinyl acetate, ethylene acrylic acid and ethylene vinyl alcohol (EVOH), polyvinylalcohol and copolymers thereof, polyamides, such as nylon, and MXD6, polyimides, polyacrylonitrile, polyvinylchloride, polyvinylidene dichloride, and polyacrylates, ionomers, polysaccharides, such as regenerated cellulose, and silicone, such as rubbers or sealants, other natural or synthetic rubbers, glassine or clay coated paper, paper board or craft paper, and metallized polymer films and vapor deposited metal oxide coated polymer films, such as $AlO_x$, $SiO_x$, or $TiO_x$.

The aforesaid substrates are likely to be in the form of a film or sheet, though this is not obligatory. The substrate may be a copolymer, a laminate, a coextrudate, a blend, a coating or a combination of any of the substrates listed above according to the compatibility of the materials with each other. In addition, the substrate may be in the form of a rigid container made from materials such as polyethylene, polypropylene, polystyrene, polyamides, PET, EVOH, or laminates containing such materials.

The aforesaid substrates may also be pretreated prior to coating by corona treatment, plasma treatment, acid treatments and flame treatments, all of which are known in the art.

In addition, the compositions of the present invention can be used as barrier layers on a wide variety of packaging containers, such as pouches, tubes, bottles, vials, bag-in-boxes, stand-up pouches, gable top cartons, thermo-formed trays, brick-packs, boxes, cigarette packs and the like. The compositions of the present invention may be used as laminating adhesives.

Of course, the present invention is not limited to just packaging applications, and may be used in any application wherein gas, or aroma barrier properties are desired, such as tires, buoyancy aides, inflatable devices generally, etc.

Any of the foregoing substrates may have primers applied thereon. The primers are applied to the substrates by methods known in the art such as spray coating, roll coating, slot coating, meniscus coating, immersion coating, and direct, offset and reverse gravure coating. Suitable primers include, but are not limited to carbodiimide, polyethylenimine, and silanes, such as N-(2-aminoethyl)-3-aminopropyltrimethoxysilane and aminopropyltriethoxysilane.

Curing

While the compositions of the present invention will form films at ambient conditions, optimum results are achieved by heating and/or free radical cures.

The compositions are preferably cured by a free radical generator, such as ultraviolet, electron beam, or gamma radiation or chemical free radical generators such as azo compounds and peroxides. Low energy electron beam is the preferred method of curing because it is cheaper than gamma sources like Cobalt M-60. Its advantage over ultraviolet radiation as a cure system lies in its ability to generate free radicals without photoinitiators. It also imparts higher yields of crosslink density and chemical grafting of the coating to the substrate. Electron beam accelerators of various types such as van de Graaf-type, resonance transformer-type, linear-type, dynamatron-type and high frequency-type can be used as a source of electron beam. Electron beams having energy of from about 5 to about 2000 KeV, preferably from about 50 to about 300 KeV discharged therefrom may be irradiated in a dose of from about 0.1 to about 10 Mrads (Mr). A most preferred dosage is 150 KeV of at least 5 Mr. Low electron beam voltages may be used if the substrate is treated in a vacuum. Commercially available sources of electron beam are Electrocure CB-150 available from Energy Sciences, Inc. (Wilmington, Mass.).

The compositions may also be ultraviolet light cured if one or more photoinitiators is added prior to curing. There are no special restrictions on the photoinitiators as long as they can generate radicals by the absorption of optical energy. Ultraviolet light sensitive photoinitiators or blends of initiators used in the UV cure of the present composition include 2-hydroxy-2-methyl-1-phenyl-propan-1-one (Darocure 1173), sold by EM Chemicals, and 2,2 Dimethoxy-2-phenyl-acetol-phenone (Irgacure 651), sold by Ciba-Geigy Corporation, Hawthorne, New York. For purposes of this invention, it has been found that from about 0.05 to about 5 weight percent based on the total solids in the composition, of the photoinitiators described therein will cause the composition to cure.

Other types of free radical generators, known to those skilled in the art may also be employed, such as promoted peroxides, azo compounds, etc.

In addition, other methods of curing may be required if a crosslinker is added to the composition. For example if a reactive silane crosslinker is added, the composition may be cured via a condensation reaction, which requires the presence of moisture. The moisture may be present in the coating solution itself, or may be added through steam or in a high humidity oven. The reaction may be accelerated through the presence of heat, for example, by heating in an oven at temperatures up to about 140° C., with temperatures of from about 60° C. to about 120° C. being preferred and temperatures of about 90° C. to about 110° C. being most preferred. Heating time is temperature dependent and the coating will reach tack free time in one to 10 seconds. The heating step serves to evaporate the solvent, and accelerate the condensation reaction between silanol groups. The additional cure chemistries required will depend on the particular crosslinking systems employed, which are well known in the art.

Optional Additives

Various optional additives can be added to the composition to improve various properties as required. These additives may be added as desired and in any amount as long as they do not degrade the performance of the barrier coatings as illustrated herein. Such additives include antiblock and slip aides, such as stearamide, oleamide or polar additives, such as epoxides, acrylates, methacrylates, polyols, glycidol, glycidyl methacrylate, ethylene glycol diglycidylether, bisphenol A diglycidylether, or polyamines, such as polyethylenimine and other silanes. Wetting agents, such as polyethoxylated phenol may also be added.

Preferred Embodiment

Water (7 g) and itaconic acid (3.02 g) are added to N-(isopropoxy, methoxy) silyl propyl polyethyleneimine (2 g) with stirring and this was stirred for 15 mins. 8 g of Part A is added to the mixture and this is stirred for 2 hours (where Part A is made by mixing 15 g N-(isopropoxy, methoxy) silyl propyl polyethyleneimine, 74 g isopropyl alcohol and 11 g itaconic acid together). After coating, drying and curing, the permeability of the composite was measured to be 51.6 cc dry, 17.1 cc at 80%RH and 26.1 cc wet and the coating thickness was determined to be 2.5 $\mu$.

EXAMPLES

Experiments 1–10

A1170 & bis-TMSEDA Addition to 1-6601/ITA (29:71wt) Formulation Keeping the ITA Level Constant in the Mixture (Where ITA is Itaconic Acid)

In experiments 1–10 the (1-6601/A1170/bisTMSEDA) :ITA formulations were utilized in a weight ratio of 29:71wt with a total solids content of 30%. The solvents employed in all the experiments described below were common industrial grade isopropanol and distilled water. The N-(isopropoxy, methoxy) silyl propyl polyethyleneimine (45% solids in isopropyl alcohol) ("1-6601") was obtained from Dow Corning Corporation (Midland, Mich.), the bis-($\gamma$-trimethoxysilylpropyl)amine (Silquest A1170 or "A1170")

from Witco, the bis-[(3-trimethoxysilyl)propyl] ethylenediamine ("bisTMSEDA") from Gelest, and the itaconic acid ("ITA")from Acros Chemicals. The coating solutions were all applied to corona treated 30 µm thick "Rayopp" oriented polypropylene film from UCB Films utilizing a #18 Myer rod. The coated film was dried in an oven at 60° C. for 10 minutes and under ambient conditions for a further 2hours. The dried coated film was then "cured" by an EB machine at 10 Megarads and 165 Kv.

The oxygen permeability values for each film were measured and recorded in units of cc/square meter per 24 hours, "dry" values being measured at 0% relative humidity and "wet" values at 90% relative humidity utilizing MOCON Oxtran 2/20 Series. Some of the coated films were also evaluated at 80%RH. The MOCON instruments were obtained from Modem Controls Corporation. For comparison, the polypropylene base film had a permeability of about 1200 cc/square meter/24 hours at all the relative humidities measured. The coating layer thickness was measured by means of Scanning Electron Microscopy (SEM).

Experiment 1

No A1170

Water (7 g) was added to a solution of 1-6601 (3.86 g) and IPA (isopropyl alcohol, 4.87 g) and the mixture stirred for 5 minutes. Itaconic acid (4.26 g) was added to the solution and the mixture was stirred for 2 hours. After coating, drying and curing, the permeability of the composite was measured to be 107.5 cc dry, 53.3 cc at 80%RH and 650.6 cc wet and the coating thickness was determined to be 2.4µm.

Experiment 2

1% A1170

1-6601 (3.71 g) and IPA (4.6 g) were stirred together for 10 mins. Water (7 g) and ITA (4.21 g) were added to the above mentioned mixture and this was stirred for 15 minutes. 0.48 g of Part A was added to the mixture and this was stirred for 2 hours (where Part A was made by mixing 15 g A1170, 74 g IPA and 11 g ITA together). After coating, drying and curing, the permeability of the composite was measured to be 118.3 cc dry, 44.8 cc at 80%RH and 594.3 cc wet and the coating thickness was determined to be 2.35 µm.

Experiment 3

4% A1170

1-6601 (3.33 g) and IPA (4 g) were stirred together for 10 mins. Water (7 g) and ITA (4.08 g) were added to the above mentioned mixture and this was stirred for 15 mins. 1.6 g of Part A was added to the mixture and this was stirred for 2 hours (where Part A was made by mixing 15 g A1170, 74 g IPA and 11 g ITA together). After coating, drying and curing, the permeability of the composite was measured to be 121.6 cc dry, 25.2 cc at 80%RH and 424.9 cc wet and the coating thickness was determined to be 2.8 µm.

Experiment 4

10% A1170

1-6601 (2.53 g) and IPA (2.65 g) were stirred together for 10 minutes. Water (7 g) and ITA (3.82 g) were added to the above mentioned mixture and this was stirred for 15 minutes. 4 g of Part A was added to the mixture and this was stirred for 2 hours (where Part A was made by mixing 15 g A1170, 74 g IPA and 11 g ITA together). After coating, drying and curing, the permeability of the composite was measured to be 68.8 cc dry, 33.1 cc at 80%RH and 61.5 cc wet and the coating thickness was determined to be 2.2 µm.

Experiment 5

13% A1170

1-6601 (2.13 g) and IPA (1.98 g) were stirred together for 10 minutes. Water (7 g) and ITA (3.69 g) were added to the above mentioned mixture and this was stirred for 15 minutes. 5.2 g of Part A was added to the mixture and this was stirred for 2 hours (where Part A was made by mixing 15 g A 1170, 74 g IPA and 11 g ITA together). After coating, drying and curing, the permeability of the composite was measured to be 37.9 cc dry, 27.4 cc at 80%RH and 85.4 cc wet and the coating thickness was determined to be 2.1 µm.

Experiment 6

16% A1170

1-6601 (1.73 g) and IPA (1.31 g) were stirred together for 10 minutes. Water (7 g) and ITA (3.56 g) were added to the above mentioned mixture and this was stirred for 15 minutes. 6.4 g of Part A was added to the mixture and this was stirred for 2 hours (where Part A was made by mixing 15 g A 1170, 74 g IPA and 11 g ITA together). After coating, drying and curing, the permeability of the composite was measured to be 6.3 cc dry, 46.7 cc at 80%RH and 578.6 cc wet and the coating thickness was determined to be 1.7 µm.

Experiment 7

19% A1170

1-6601 (1.33 g) and IPA (0.65 g) were stirred together for 10 minutes. Water (7 g) and ITA (3.42 g) were added to the above mentioned mixture and this was stirred for 15 minutes. 7.6 g of Part A was added to the mixture and this was stirred for 2 hours (where Part A was made by mixing 15 g A1170, 74 g IPA and 11 g ITA together). After coating, drying and curing, the permeability of the composite was measured to be 4.2 cc dry, 136.2 cc at 80%RH and 792.1 cc wet and the coating thickness was determined to be 2.3 µm.

Experiment 8

4% bisTMSEDA 1-6601 (3.33 g) and IPA (4 g) were stirred together for 10 minutes. Water (7 g) and ITA (4.08 g) were added to the above mentioned mixture and this was stirred for 15 minutes. 1.6 g of Part B was added to the mixture and this was stirred for 2 hours (where Part B was made by mixing 24.2 g bisTMSEDA, 64.8 g IPA and 11 g ITA together). After coating, drying and curing, the permeability of the composite was measured to be 77.8 cc dry and 472.1 cc wet and the coating thickness was determined to be 2.7µm.

Experiment 9

10% bisTMSEDA 1-6601 (2.53 g) and IPA (2.65 g) were stirred together for 10 minutes. Water (7 g) and ITA (3.82 g) were added to the above mentioned mixture and this was stirred for 15 minutes. 4 g of Part B was added to the mixture and this was stirred for 2 hours (where Part B was made by mixing 24.2 g bisTMSEDA, 64.8 g IPA and 11 g ITA together). After coating, drying and curing, the permeability of the composite was measured to be 33 cc dry and 332.9 cc wet and the coating thickness was determined to be 1.05 μm.

Experiment 10

19% bisTMSEDA 1-6601 (1.33 g) and IPA (0.65 g) were stirred together for 10 minutes. Water (7 g) and ITA (3.42 g) were added to the above mentioned mixture and this was stirred for 15 minutes. 7.6 g of Part B was added to the mixture and this was stirred for 2 hours (where Part B was made by mixing 24.2 g bisTMSEDA, 64.8 g IPA and 11 g ITA together). After coating, drying and curing, the permeability of the composite was measured to be 7.9 cc dry and 209 cc wet and the coating thickness was determined to be 1.95 μm.

The barrier data for Examples 1 to 10 is shown below in Table 1.

Experiment 11

No A1170

Water (7 g) was added to a solution of 1-6601 (4.67 g) and IPA (4.43 g) and the mixture stirred for 5 minutes. Itaconic acid (3.9 g) was added to the solution and the mixture was stirred for 2 hours. After coating, drying and curing, the permeability of the composite was measured to be 84.1 cc dry, 155.6 cc at 80%RH and 993.9 cc wet and the coating thickness was determined to be 2 μm.

Experiment 12

15% A1170

1-6601 (2.67 g) and IPA (1.09 g) were stirred together for 10 mins. Water (7 g) and ITA (3.24 g) were added to the above mentioned mixture and this was stirred for 15 mins. 6 g of Part A was added to the mixture and this was stirred for 2 hours (where Part A was made by mixing 15 g A1170,

TABLE 1

| Expt # | bis-silane type | Weight Ratio 1-6601/bis-silane/ITA | OTR[1] 90% RH cc/m²/day | OTR 80% RH cc/m²/day | OTR 0% RH cc/m²/day | Coating Thickness μm | OTR$_{predicted}$[2] 3 μm coating 90% RH cc/m²/day | OTR$_{predicted}$[3] 3 μm coating 80% RH cc/m²/day | OTR$_{predicted}$[4] 3 μm coating 0% RH cc/m²/day |
|---|---|---|---|---|---|---|---|---|---|
| 1 | none | 29/0/71 | 650.6 | 53.2 | 107.5 | 2.4 | 581.6 | 42.9 | 87.6 |
| 2 | A1170 | 27.8/1.2/71 | 594.3 | 44.8 | 118.3 | 2.35 | 519.6 | 35.4 | 94.7 |
| 3 | A1170 | 25/4/71 | 424.9 | 25.2 | 121.6 | 2.8 | 405.9 | 23.6 | 114.3 |
| 4 | A1170 | 19/10/71 | 61.5 | 33.1 | 68.8 | 2.2 | 45.7 | 24.4 | 51.2 |
| 5 | A1170 | 16/13/71 | 85.4 | 27.4 | 37.9 | 2.1 | 61.0 | 19.3 | 26.8 |
| 6 | A1170 | 13/16/71 | 578.6 | 46.7 | 6.3 | 1.7 | 411.1 | 26.9 | 3.6 |
| 7 | A1170 | 10/19/71 | 792.1 | 136.2 | 4.2 | 2.3 | 713.8 | 107.1 | 3.2 |
| 8 | bis-TMSEDA | 25/4/71 | 472.1 | — | 77.8 | 2.7 | 441.7 | — | 70.5 |
| 9 | bis-TMSEDA | 19/10/71 | 332.9 | — | 33 | 1.05 | 141.2 | — | 11.8 |
| 10 | bis-TMSEDA | 10/19/71 | 209 | — | 7.9 | 1.95 | 144.4 | — | 5.1 | where:
[1] OTR is oxygen transmission rate or oxygen gas permeability
[2] OTR predicted was calculated by the use of the Generic Composite Permeability Eqt: Tt/Pt = Ts/Ps + Tc/Pc where T refers to the thickness, in microns, and P to the permeability coefficient of the composite (Tt, Pt), substrate (Ts, Ps), & adhesive (Tc, Pc). The substrate OPP was measured to be 30 microns thick and have an OTR of 1238 cc/m²/day as measured at 90% RH.
[3] same as 2 except that the permeability was measured to be 1266 cc/m²/day at 80% RH
[4] same as 2 except that the permeability was measured to be 1191 cc/m²/day at 0% RH As can be seen from the above table, substantial improvements in oxygen transmission have been achieved with the bis-silane over the control not having the bis-silane.

Experiments 11–14

A1170 & Bis-TMSEDA Addition to 1-6601/ITA (35:65wt) Formulation Keeping the ITA Level Constant in the Mixture (Where ITA is Itaconic Acid)

In experiments 11–14 the (1-6601/A1170/bisTMSEDA):ITA formulations were utilized in a weight ratio of 35:65wt with a total solids content of 30%. The solvents employed in all the experiments described below were common industrial grade isopropanol and distilled water. The 1-6601 was obtained from Dow Corning Corporation (Midland, Mich.), the Silquest A1170 from Witco, the bisTMSEDA from Gelest, and the itaconic acid from Acros Chemicals. The coating solutions were all applied to corona treated 30 μm thick "Rayopp" oriented polypropylene film from UCB Films utilizing a #18 Myer rod. The coated film was dried in an oven at 60° C. for 10 minutes and under ambient conditions for a further 2 hours. The dried coated film was then "cured" by an EB machine at 10 Megarads and 165 Kv.

74 g IPA and 11 g ITA together). After coating, drying and curing, the permeability of the composite was measured to be 559.7 cc wet and the coating thickness was determined to be 2.1 μm.

Experiment 13

20% A1170

Water (7 g) and ITA (3.02 g) were added to 1-6601 (2 g) with stirring and this was stirred for 15 minutes. 8 g of Part A was added to the mixture and this was stirred for 2 hours (where Part A was made by mixing 15 g A1170, 74 g IPA and 11 g ITA together). After coating, drying and curing, the permeability of the composite was measured to be 51.6 cc dry, 17.1 cc at 80%RH and 26.1 cc wet and the coating thickness was determined to be 2.5 μm.

Experiment 14

20% bisTMSEDA

Water (7 g) and ITA (3.02 g) were added to 1-6601 (2 g) with stirring and this was stirred for 15 minutes. 8 g of Part B was added to the mixture and this was stirred for 2 hours (where Part B was made by mixing 24.2 g bisTMSEDA, 64.8 g IPA and 11 g ITA together). After coating, drying and curing, the permeability of the composite was measured to be 28 cc dry and 689.7 cc wet and the coating thickness was determined to be 1.4 μm.

Table 2 shows the barrier data for Experiments 11 to 14.

TABLE 2

| Expt # | bis-silane type | Weight Ratio 1-6601/bis-silane/ITA | OTR[1] 90% RH cc/m²/day | OTR 80% RH cc/m²/day | OTR 0% RH cc/m²/day | Coating Thickness μm | OTR$_{predicted}$[2] 3 μm coating 90% RH cc/m²/day | OTR$_{predicted}$[3] 3 μm coating 80% RH cc/m²/day | OTR$_{predicted}$[4] 3 μm coating 0% RH cc/m²/day |
|---|---|---|---|---|---|---|---|---|---|
| 11 | none | 35/65 | 993.9 | 155.6 | 84.1 | 2 | 904.7 | 108.2 | 57.4 |
| 12 | A1170 | 20/15/65 | 559.7 | — | — | 2.1 | 453.3 | — | — |
| 13 | A1170 | 15/20/65 | 26.1 | 17.1 | 51.6 | 2.5 | 21.8 | 14.3 | 43.3 |
| 14 | bis-TMSEDA | 15/20/65 | 689.7 | — | 28 | 1.4 | 457.9 | — | 13.2 |

As can be seen from the above table, substantial improvements in oxygen been achieved with the bis-silane over the control not having the bis-silane.

Other variations may be made in compounds, compositions, and methods described herein without departing from the essential features of the invention. The embodiments of the invention specifically illustrated herein are exemplary only and not intended as limitations on their scope except as defined in the appended claims.

That which is claimed is:

1. A composition comprising:
an ethylenically unsaturated acid and a polyamine optionally having a crosslinker reacted therein, and a bis-silane, wherein said polyamine has four or more A, B, or C units, where:
A is an —R²—N(R¹)₂ unit, B is an —R¹—N(R²—)₂ unit, and C is an (—R²)₃ N— unit, where:
R¹ is independently a monovalent group selected from hydrogen, alkyl, substituted alkyl, aryl, substituted aryl, arylalkyl, and alkylaryl, and R² is independently selected from the group consisting of: linear or branched alkylene groups or substituted alkylene groups having from 1 to 18 carbon atoms, and arylene groups or substituted arylene groups having from 6 to 18 carbon atoms; and said bis-silane has the formula:

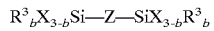

R³$_b$X$_{3-b}$Si—Z—SiX$_{3-b}$R³$_b$ wherein Z is R⁴NH(R⁴NH)p R⁴, each R³ is a hydrocarbon group, each X is an alkoxy group with 1 to 4 carbon atoms, a halogen atom, an oxime group or an acyloxy group, each R⁴ is a divalent hydrocarbon group having 1 to 12 carbon atoms; b is from 0 to 3 and p is 0 or 1.

2. The composition of claim 1, wherein the equivalents ratio of nitrogen atoms on the polyamine to the silicon atoms on the bis-silane to the acid groups on the ethylenically unsaturated acid is from 10:1:1 to 1:10:1 to 1:1:100.

3. The composition of claim 1, wherein the composition is dissolved in a solvent and the solvent is selected from the group consisting of water, alcohol, ether derivatives of mono and poly glycols, and mixtures thereof, and the solvent constitutes 5–95 parts by weight of the total composition.

4. The composition of claim 1, wherein the ethylenically unsaturated acid is selected from the consisting of itaconic, fumaric, maleic, citraconic, acrylic, methacrylic, and cinnamic, itaconic acid monomethylester, vinylphosphonic acid, mesaconic acid, sorbic acid, and vinyl sulphonic acid, and mixtures thereof.

5. The composition of claim 1, wherein said bis-silane is bis-(g-trimethoxysilylpropyl)amine.

6. The composition of claim 1, wherein said bis-silane is (bis-[(3-trimethoxysilyl)propyl]ethylenediamine).

7. The composition of claim 1, wherein the polyamine is polyethylenimine.

8. The composition of claim 7, wherein the molar ratio of nitrogen atoms on the polyamine to the acid group on the ethylenically unsaturated acid is from 10:1 to 1:100.

9. The composition of claim 7, wherein the composition is coated on a substrate, and the substrate is selected from the group consisting of polyolefins; oriented polypropylene; cast polypropylene; polyethylene and polyethylene copolymer; polystyrene; polyesters; polyethylene terephthalate; polyethylene naphthalate; polyolefin copolymers; ethylene vinyl acetate; ethylene acrylic acid; ethylene vinyl alcohol; polyvinylalcohol and copolymers thereof; polyamides, nylon; and MXD6; polyimides; polyacrylonitrile; polyvinylchloride; polyvinyl dichloride; polyvinylidene chloride; polyacrylates; ionomers; polysaccharides; regenerated cellulose; silicone; rubbers or sealants; natural or synthetic rubbers; glassine or clay coated paper; paper board; craft paper; metallized films; and vapor deposited metal oxide coated polymer films.

10. The composition of claim 9, wherein the coated composition is disposed on one or more additional substrates to form a laminate, and said additional substrate or substrates are optionally primed.

11. The composition of claim 10, wherein the additional substrates used to form the laminate are selected from the group consisting of polyolefins; oriented polypropylene; cast polypropylene; polyethylene and polyethylene copolymer; polystyrene; polyesters; polyethylene terephthalate; polyethylene naphthalate; polyolefin copolymers; ethylene vinyl acetate; ethylene acrylic acid; ethylene vinyl alcohol; polyvinylalcohol and copolymers thereof; polyamides, nylon; and MXD6; polyimides; polyacrylonitrile; polyvinylchloride; polyvinyl dichloride; polyvinylidene chloride; polyacrylates; ionomers; polysaccharides; regenerated cellulose; silicone; rubbers or sealants; natural or synthetic rubbers; glassine or clay coated paper; paper board; craft paper; metallized films; and vapor deposited metal oxide coated polymer films.

12. The composition of claim 7, wherein the substrate is primed.

13. The composition of claim 12, wherein the primer is selected from the group consisting of a silane, polyethylenimine, and carbodiimide.

14. The composition of claim 1, wherein the crosslinker is present and is a reactive silane having the general formula QSiR$_m$(OR)$_{3-m}$, where Q contains a group selected from the group consisting of acrylates, aldehydes, methacrylates, acrylamides, methacrylamides, isocyanates, isothiocyanate, anhydrides, epoxides, acid chlorides, linear or branched halogenated alkyl, and halogenated aryl, and m is 1, 2 or 3, and R is a group having 1 to 4 carbon atoms, and said composition has optionally been neutralized.

15. The composition of claim 1, wherein the coated substrate is heated in the presence of moisture.

16. A method comprising the steps of
(I) mixing an ethylenically unsaturated acid, a bis-silane, and a polyamine optionally having a crosslinker reacted therein, wherein said polyamine has four or more A, B, or C units, where:

A is an —$R^2$—$N(R^1)_2$ unit, B is an $R^1$—$N(R^2$—$)_2$ unit, and C is an (—$R^2)_3N$— unit where:
  $R^1$ is independently a monovalent group selected from hydrogen, alkyl, substituted alkyl, aryl, substituted aryl,
  arylatkyl, and alkylaryl, and $R^2$ is independently selected from the group consisting of: linear or branched alkylene groups or substituted alkylene groups having from 1 to 18 carbon atoms, arylene groups or substituted arylene groups having from 6 to 18 carbon atoms; and said bis-silane has the formula:

$$R^3{}_b X_{3-b} Si\text{—}Z\text{—}SiX_{3-b} R^3{}_b$$

wherein Z is $R^4 NH(R^4 NH)p\ R^4$, each $R^3$ is a hydrocarbon group, each X is an alkoxy group with 1 to 4 carbon atoms, a halogen atom, an oxime group or an acyloxy group, each $R^4$ is a divalent hydrocarbon group having 1 to 12 carbon atoms; b is from 0 to 3 and p is 0 or 1;
(II) coating a substrate with the mixture of step (I); and
(III) treating the coated substrate of step (II) to initiate a free radical reaction.

17. The method of claim 16, wherein the equivalents ratio of nitrogen atoms on the polyamine to the silicon atoms on the bis-silane to the acid groups on the ethylenically unsaturated acid is from 10:1:1 to 1:10:1 to 1:1:100.

18. The method of claim 16, wherein the composition is dissolved in a solvent and the solvent is selected from the group consisting of water, alcohol, ether derivatives of mono and poly glycols, and mixtures thereof, and the solvent constitutes 5–95 parts by weight of the total composition.

19. The method of claim 16, wherein the ethylenically unsaturated acid is selected from the group consisting of itaconic, fumaric, maleic, citraconic, acrylic, methacrylic, and cinnamic, itaconic acid monomethylester, vinylphosphonic acid, mesaconic acid, sorbic acid, and vinyl sulphonic acid, and mixtures thereof.

20. The method of claim 16, wherein said bis-silane is bis-(g-trimethoxysilylpropyl)amine.

21. The method of claim 16, wherein said bis-silane is (bis- [(3-trimethoxysilyl)propyl]ethylenediamine).

22. The method of claim 16, wherein the polyamine is polyethylenimine.

23. The method of claim 22, wherein the molar ratio of nitrogen atoms on the polyamine to the acid groups on the ethylenically unsaturated acid is from 10:1 to 1:100.

24. The method of claim 22, comprising the substrate is selected from the group consisting of polyolefins; oriented polypropylene; cast polypropylene; polyethylene and polyethylene copolymer; polystyrene; polyesters; polyethylene terephthalate; polyethylene naphthalate; polyolefin copolymers; ethylene vinyl acetate; ethylene acrylic acid; ethylene vinyl alcohol; polyvinylalcohol and copolymers thereof; polyamides, nylon; and MXD6; polyimides; polyacrylonitrile; polyvinylchloride; polyvinyl dichloride; polyvinylidene chloride; polyacrylates; ionomers; polysaccharides; regenerated cellulose; silicone; rubbers or sealants; natural or synthetic rubbers; glassine or clay coated paper; paper board; craft paper; metallized films; and vapor deposited metal oxide coated polymer films.

25. The method of claim 24, wherein the coated composition is deposited on one or more additional substrates to form a laminate, and said additional substrate or substrates are optionally primed.

26. The method of claim 25, wherein the substrate is primed.

27. The method of claim 16 wherein the crosslinker is present and is a reactive silane having the general formula $QSiR_m(OR)_{3-m}$, where Q contains a group selected from the group consisting of acrylates, aldehydes, methacrylates, acrylamides, methacrylamides, isocyanates, isothiocyanate, anhydrides, epoxides, acid chlorides, linear or branched halogenated alkyl, and halogenated aryl, and m is 1, 2 or 3, and R is a group having 1 to 4 carbon atoms, and said composition has optionally been neutralized.

28. The method of claim 24, wherein the coated substrate is heated in the presence of moisture.

29. The method of claim 16, wherein said free radical reaction is initiated by electron beam radiation, gamma radiation or ultraviolet radiation, optionally in the presence of photoinitiators, or said free radical reaction is initiated thermally in the presence of a free radical generator.

30. The method of claim 29, wherein said coated substrate is cured by electron beam radiation at from 5 KeV to 2000 KeV and greater than 0.1 Mrads.

31. The method of claim 29, wherein said coated substrate is cured by electron beam radiation at 150 kV and at least 5 Mrads.

32. The method of claim 16, wherein the coated substrate of step (II) is heated.

33. The method of claim 16, wherein the crosslinker is present and is an organic crosslinker.

34. The product made by the method of claim 16.
35. The product made by the method of claim 21.
36. The product made by the method of claim 24.
37. The product made by the method of claim 29.

38. A packaging container the improvement comprising: at least one barrier layer forming an integral part of said packaging container, wherein said barrier layer is formed by the method of claim 16.

39. The packaging container of claim 38, wherein the container is selected from the group consisting of: pouches, tubes, bottles, vials, bag-in-boxes, stand-up pouches, gable top cartons, thermo-formed trays, brick-packs, boxes, and cigarette packs.

* * * * *